United States Patent Office 3,186,995
Patented June 1, 1965

3,186,995
PREPARATION OF DITHIOLIUM COMPOUNDS
Erwin Klingsberg, Mountainside, N.J., assignor to American Cyanamid Company, Stamford, Conn., a corporation of Maine
No Drawing. Filed Aug. 2, 1963, Ser. No. 299,473
4 Claims. (Cl. 260—294.8)

This application is a continuation-in-part of applications Serial No. 27,254, filed May 6, 1960, now abandoned, and Serial No. 203,723, filed June 20, 1962.

This invention relates to the preparation of new aromatic 1,2-dithiolium salts.

More specifically, it relates to a process of preparing compounds of the formula:

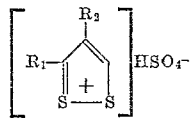
(I)

wherein each of the $R_1$ and $R_2$ groups is hydrogen, lower alkyl, phenyl, naphthyl, thienyl, furfuryl, pyridyl or phenyl lower alkyl. When $R_1$ and/or $R_2$ is a cyclic substituent, it may contain up to three halo (e.g., chloro and bromo), nitro, lower alkyl, lower alkoxy, di-lower alkylamino, lower alkanoyl, lower alkanoyloxy, sulfo or carboxy substituents.

The dithiolium salts of Formula I are prepared by treating a trithione (i.e., a 1,2-dithiole-3-thione) with an organic peracid to effect oxidation of the nucleus, thereby forming a dithiolium cation according to the following equation:

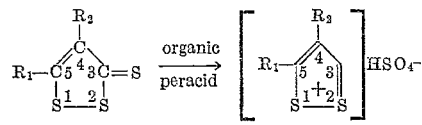

wherein $R_1$ and $R_2$ are defined as above. This reaction, in general, involves treating the trithione with the peracid at a temperature below 40° C., preferably below room temperature, in a solvent inert to the peracid, such as acetone or methylethylketone, and separating the resulting bisulfate salt. This water-soluble salt may be converted to other salts by addition of bromide, iodide, thiocyanate, fluoborate, picrate or perchlorate anions, or the like.

Trihitones which may be used in the preparation of the corresponding dithiolium compounds of this invention include such trithiones as 5-ethyl- or 5-methyl-1,2-dithiole-3-thione,
4,5-diamethyl-1,2-dithiole-3-thione,
4-butyl-5-methyl-1,2-dithiole-3-thione,
4-phenyl-5-methyl-1,2-dithiole-3-thione,
4-(p-nitrophenyl)-1,2-dithiole-3-thione,
4-methyl-1,2-dithiole-3-thione,
4-ethyl-1,2-dithiole-3-thione,
5-(2-furfuryl)-1,2-dithiole-3-thione,
4-phenyl-1,2-dithiole-3-thione,
4-p-tolyl-1,2-dithiole-3-thione,
4-p-t-butylphenyl-1,2-dithiole-3-thione,
5-phenyl-1,2-dithiole-3-thione,
5-α-naphthyl-1,2-dithiole-3-thione,
5-(p-dimethylaminophenyl)-1,2-dithiole-3-thione,
5-(p-chlorophenyl)-1,2-dithiole-3-thione,
5-(p-anisyl)-1,2-dithiole-3-thione,
5-p-tolyl-1,2-dithiole-3-thione,
5-(o-anisyl)-1,2-dithiole-3-thione,
5-(2-thienyl)-1,2-dithiole-3-thione,
5-(3,4-dimethoxyphenyl)-1,2-dithiole-3-thione,
5-(5-methyl-2-methoxyphenyl)-1,2-dithiole-3-thione,
4-methyl-5-phenyl-1,2-dithiole-3-thione,
4-methyl-5-(p-anisyl)-1,2-dithiole-3-thione,
4-methyl-5-(2,4-xylyl)-1,2-dithiole-3-thione,
4-methyl-5-(3,4-dimethoxyphenyl)-1,2-dithiole-3-thione
4,5-diphenyl-1,2-dithiole-3-thione,
4-(3'sulfophenyl)trithione,
4-(3'-propionylphenyl)
4-(1-phenylpropyl)trithione,
4-(p-acetoxyphenyl)trithione,
4-(3'-sulfophenyl)trithione,
4-(3'-propionylphenyl)trithione,
5-(2'-pyridyl)trithione,
4-(3'-methylpyridyl)trithione,
4-ethyl-5-(4'-pyridyl)trithione,
4-butyl-5-(4'-pyridyl)trithione and the like.

Compounds of Formula I are readily converted to new cationic dyestuffs by condensation with a tertiary aromatic amine having a free para position: The dithiolium salts react at the 3- (or 5-) position when this position is free. These dyestuffs color acrylic fibers intense shades when applied by customary methods. The condensation reaction proceeds readily in an inert solvent such as an alcohol (e.g., ethanol) at temperatures above 60° C. up to reflux. Yields are often improved by the use of a mild oxidizing agent such as potassium persulfate. The product may be isolated by conventional methods and purified by recrystallization. If the dye still contains a free 5-position, repetition of the condensation reaction with a second molecule of tertiary amine gives dyes containing two tertiary amino groups.

The following examples, in which parts are by weight (unless otherwise specified) and degrees are in centigrade, are presented to illustrate the present invention further.

Example 1

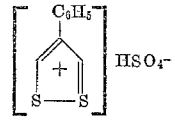

A solution of 6 parts of 4-phenyl-1,2-dithiole-3-thione in 125 parts by volume of acetone is chilled and stirred while 16 parts of 40% peracetic acid is slowly added. After the reaction is complete, the yellow product is filtered, washed and crystallized from alcohol.

Example 2

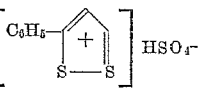

A solution of 12 parts of 5-phenyl-1,2-dithiole-3-thione in 400 parts by volume of acetone is stirred, chilled, and treated by the gradual addition of 32 parts of 40% peracetic acid. The mixture is then stirred to complete the reaction, and filtered. The yellow product is crystallized from nitromethane. It is readily soluble in water to give a yellow solution, from which perchloric acid precipitates the yellow perchlorate and sodium iodide precipitates the bright orange iodide. Picric acid gives the bright yellow picrate.

Example 3

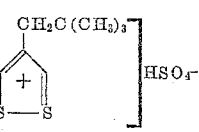

A solution of 2 parts of 4-neopentyl-1,2-dithiole-3-thione in 50 parts by volume of acetone is treated with 6 parts of 40% peracetic acid dissolved in 10 parts by volume of acetone. After completion of the reaction, the crystalline produce is obtained by filtration.

Example 4

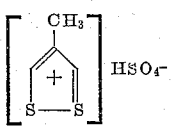

This product is obtained by the procedure of Example 3, starting with 4-methyl-1,2-dithiole-3-thione.

Example 5

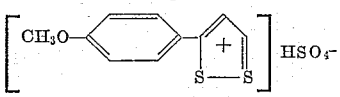

This product is obtained by the procedure of Example 2, starting with 5-p-anisyl-1,2-dithiole-3-thione.

Example 6

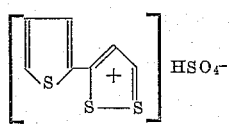

This product is obtained by the procedure of Example 2, starting with 5-(2-thienyl)-1,2-dithiole-3-thione.

Example 7

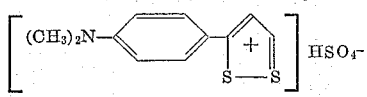

To a solution of 2.5 parts of 5-(p-dimethyl-aminophenyl)-1,2-dithiole-3-thione in 800 parts by volume of acetone is gradually added a solution of 5.0 parts by volume of 40% peracetic acid in 50 parts by volume of acetone. The red-violet product is purified by crystallization from acetic acid.

Example 8

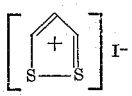

Fifty parts by volume of diethyl fumarate and 15 parts of sulfur are boiled together for two hours. The reaction product is fractionated to yield 5-carbethoxy-1,2-dithiole-3-one, an oil of boiling point 125–140° C./5 mm.

Ten parts of 5-carbethoxy-1,2-dithiole-3-one are mixed with six parts of phosphorus pentasulfide and 75 parts of pyridine and the mixture is heated to reflux for 1½ hours. The product is treated with mercuric chloride (1 equivalent) in acetone solution to yield a precipitate which is then suspended in 100 parts of dilute HCl and then treated with $H_2S$ until conversion to mercuric sulfide is complete. The precipitate is filtered off and the filtrate extracted three times with fifty parts of the ether each time. The ether extracts are combined, dried and evaporated. Crystallization of the solid from hexane yields 5-carbethoxy-1,2-dithiole-3-thione as a purplish solid melting at about 65–66° C.

One part of the 5-carbethoxy-1,2-dithiole-3-thione is saponified by dissolving in a solution of five parts of sodium sulfide nonahydrate in 200 parts of water. The solution is allowed to stand at room temperature until saponification is complete. Acidification with HCl and then crystallization of the reaction product from benzene-hexane yields the compound 5-carboxy-1,2-dithiole-3-thione as a purple-brown crystalline solid melting at about 136–139° C. (with dec.).

To 4.6 parts of 5-carboxy-1,2-dithiole-3-thione dissolved in 125 parts of acetone are added, gradually at 25° C., 15 parts of 40% peracetic acid. The product, dithiolium hydrogen sulfate, is precipitated as the iodide by treatment with hydriodic acid. The iodide crystallizes from propanol as orange needles melting at 179–181° C. (with dec.).

Example 9

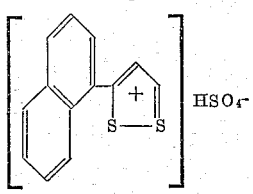

This product is prepared by the procedure of Example 1 starting wth an equivalent amount of 5-(1-naphthyl)-1,2-dithiole-3-thione, in place of the dithiolethione used therein.

Example 10

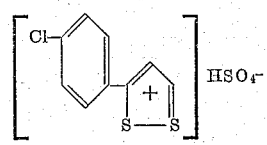

This product is prepared by the procedure of Example 1, starting with an equivalent amount of 5-(p-chlorophenyl)-1,2-dithiole-3-thione, in place of the dithiolethione used therein.

Example 11

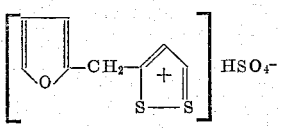

This product is obtained by the procedure of Example 2, starting with an equivalent amount of 5-(furfuryl)-1,2-dithiole-3-thione in place of the dithiolethione used therein.

Example 12

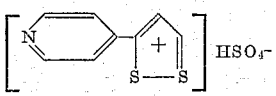

This product is obtained by the procedure of Example 2, starting with an equivalent amount of 5-(4-pyridyl)-1,2-dithiole-3-thione in place of the dithiolethione used therein.

Example 13

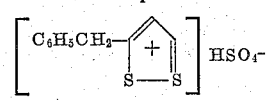

This product is obtained by the procedure of Example 2, starting with an equivalent amount of 5-benzyl-1,2-dithiole-3-thione in place of the dithiolethione used therein.

Example 14

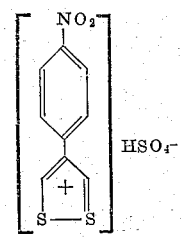

This product is prepared by the procedure of Example 1, starting with an equivalent amount of 4-(p-nitrophenyl)-1,2-dithiole-3-thione in place of the dithiolethione used therein.

Example 15

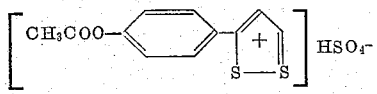

This product is prepared by the procedure of Example 1, starting with an equivalent amount of 5-(p-acetoxyphenyl)-1,2-dithiole-3-thione in place of the dithiolethione used therein.

*Example 16*

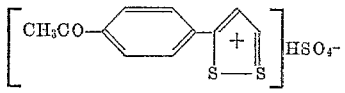

This product is prepared by the procedure of Example 1, starting with an equivalent amount of 5-(p-acetylphenyl)-1,2-dithiole-3-thione in place of the dithiolethione used therein.

*Example 17*

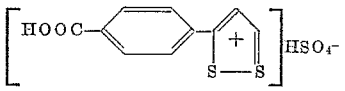

This product is prepared by the procedure of Example 1, starting with an equivalent amount of 5-(p-carboxyphenyl)-1,2-dithiole-3-thione in place of the dithiolethione used therein.

*Example 18*

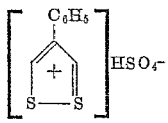

This product is prepared by the procedure of Example 1, substituting an equivalent amount of perbenzoic acid for the peracetic acid used therein.

*Example 19*

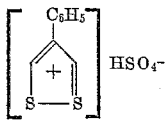

This product is prepared by the procedure of Example 1, substituting an equivalent amount of perphthalic acid for the peracetic acid used therein.

I claim:

1. A process of preparing the compound of the formula:

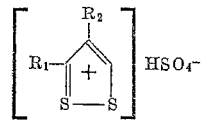

wherein $R_1$ and $R_2$ are individually selected from the group consisting of lower alkyl, phenyl, naphthyl, hydrogen, thienyl, furfuryl, pyridyl and phenyl lower alkyl, said $R_1$ and $R_2$ groups, when cyclic, bearing up to three substituents selected from the group consisting of halo, nitro, lower alkyl, lower alkoxy, di-lower alkylamino, lower alkanoyl, lower alkanoyloxy, sulfo and carboxy, which comprises reacting a compound of the formula:

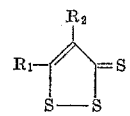

wherein $R_1$ and $R_2$ are as above defined, with a percarboxylic acid, said reaction being conducted at a temperature not above about 40° C. in an inert solvent, and separating the product thus formed.

2. The process of claim 1 wherein the percarboxylic acid is selected from the group consisting of peracetic, perpropionic, perbutyric, perbenzoic and perphthalic acids.

3. The process of claim 1 wherein the percarboxylic acid is peracetic acid.

4. The process of claim 1 wherein the reaction is conducted at a temperature not above room temperature.

References Cited by the Examiner

Walter et al.: Annalen der Chemie, vol. 649 (1961), pp. 88 and 89.

IRVING MARCUS, *Primary Examiner.*

NICHOLAS RIZZO, *Examiner.*